(No Model.)
J. C. SCHUMAN.
METHOD OF PREPARING STARCH FROM GRAIN.
No. 345,927. Patented July 20, 1886.
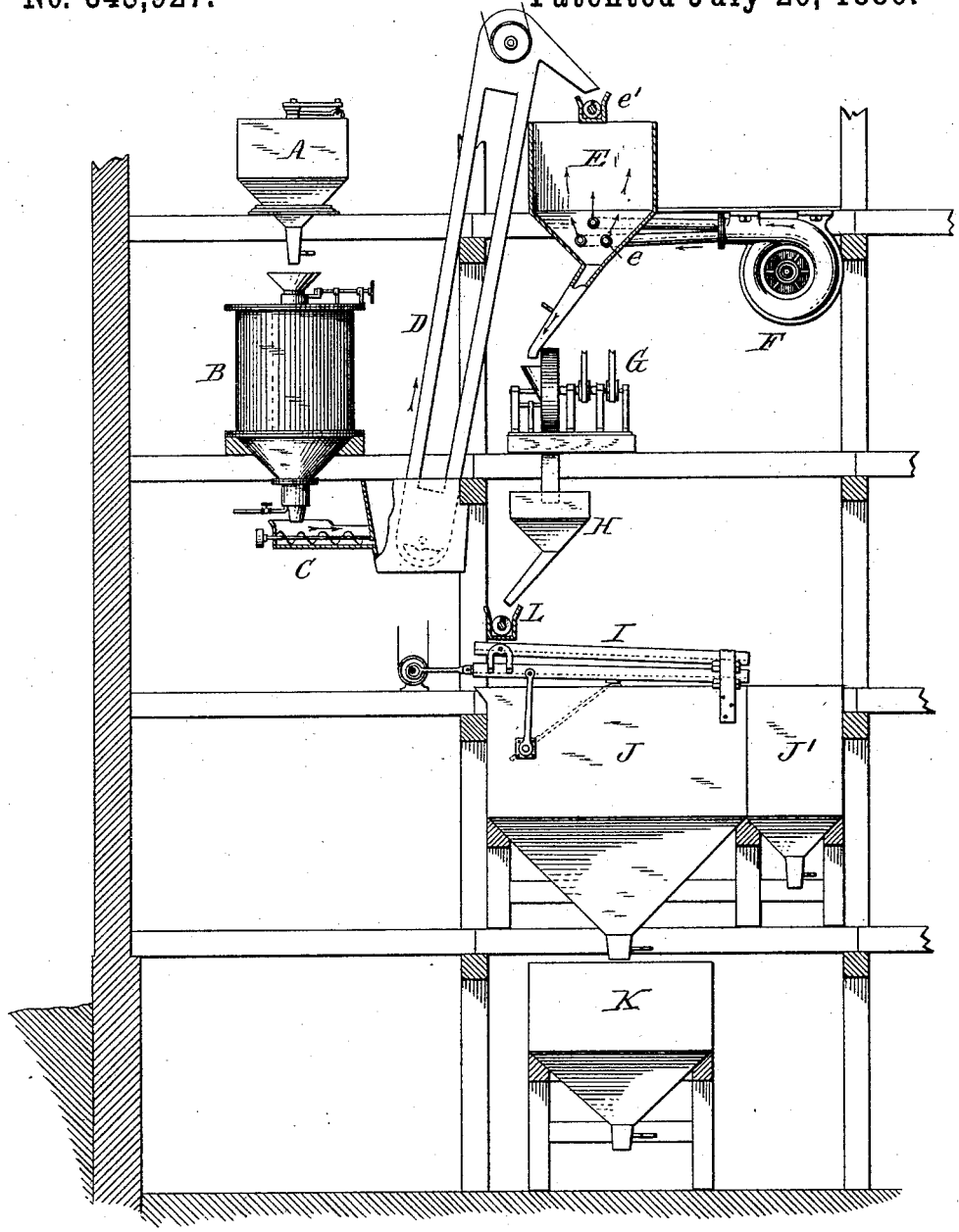

UNITED STATES PATENT OFFICE.

JOHN C. SCHUMAN, OF AKRON, ASSIGNOR TO WILLIAM T. JEBB, OF BUFFALO, NEW YORK.

METHOD OF PREPARING STARCH FROM GRAIN.

SPECIFICATION forming part of Letters Patent No. 345,927, dated July 20, 1886.

Application filed April 21, 1886. Serial No. 199,586. (No model.)

*To all whom it may concern:*

Be it known that I, JOHN C. SCHUMAN, of Akron, in the county of Erie and State of New York, have invented new and useful Improvements in the Method of Preparing Starch from Grain, of which the following is a specification.

This invention relates to that method of extracting starch from grain, especially Indian corn or maize, in which the corn is first softened by steeping, then reduced, and then sifted or screened for the purpose of separating the starch-meal from the offal.

The object of this improvement is to separate the valuable portions of the kernels of corn from the hulls in a simple and expeditious manner; and my invention consists, to that end, of the improvements which will be hereinafter fully set forth, and pointed out in the claims.

The accompanying drawing represents a plant of machinery by which my invention can be practiced.

A represents a weigh hopper or charger which receives the Indian corn or maize, and from which the same passes to the steep-tank B. In the latter the corn is steeped sufficiently to permit of the separation of the hulls from the more valuable portions of the kernels by the subsequent treatment. The operation of steeping is preferably conducted by supplying the steep-tank with water having a temperature of about 140° Fahrenheit, and renewing the steep-water from time to time until the corn has reached the desired degree of softness. The corn may be steeped in this manner for a period of from eight to twelve hours, or longer. While I prefer to conduct the steeping operation in this manner it may be modified, as the condition of the corn and other circumstances may render expedient. The corn is sufficiently steeped when the kernels have become softened to such an extent that the hulls will separate easily from the inner valuable portions of the kernels.

C represents a conveyer which receives the steeped corn from the steep-tank B, and D represents an elevator whereby the steeped corn is elevated from the conveyer C to a receiving bin or hopper, E. The latter is provided with perforated pipes *e*, which are supplied with air by a fan, F, or other suitable air-propelling device, and which direct air-currents through the corn in the bin E, thereby drying and cooling the same. In passing through the conveyer and elevator the steeped corn is loosened so that the air-currents issuing from the perforated pipes *e* will come in contact with all parts of the corn and thoroughly remove the heat and moisture therefrom. The steeped corn is subjected to the action of the air-currents in the bin E, preferably for about two hours. This causes the hulls to become tough and facilitates the separation of the hulls from the other portions of the kernels. When two or more bins, E, are arranged side by side, the corn coming from the elevator is distributed to the several bins by a conveyer, *e'*.

G represents a reducing-machine which receives the corn from the bin E, and in which the corn is reduced in such manner that the hulls are stripped in large flakes from the inner portions of the kernels, and the latter are reduced to such a degree of fineness that they can be readily separated from the hulls by sifting. I prefer for this purpose a machine which consists of several concentric rows of beaters revolving at a high speed in opposite directions within an inclosing-case, and whereby the grain is whipped or beaten. While I prefer to employ a whipping or beating machine for this reduction, any other suitable reducing-machine may be employed for this purpose. For instance, a disk-mill in which one of the disks has an eccentric movement with reference to the other, or a roller-mill; but none of these effect the desired reduction so completely and advantageously as the beating or whipping machine first mentioned.

H represents a hopper which receives the reduced material from the reducing-machine G.

I represents a screen-separator whereby the hulls are separated from the finer portions of the reduced material, the latter passing to a receiver, J, while the hulls tail off and are collected in a receiver, J'.

K represents a final receiver which receives the reduced material from the receiver J. The separator which I prefer to employ for this purpose consists of an upper coarse screen and a lower fine screen, as described and shown in Letters Patent of the United States No. 334,090, granted to me January 12, 1886. When two or more screen-separators are arranged side by side, the material is distributed to the separators by a conveyer, L. The reduced material so obtained from the corn consists of the starch, the fragments of the glutinous inner portions of the kernels, and the germs. It is practically free from hulls and can now be further treated, as may be necessary to produce the desired ultimate product. For instance, it may be worked up into laundry or culinary starch, grape-sugar or glucose, or it may be used for the manufacture of distilled spirits, or as a substitute for malt in the manufacture of beer and ale, &c. When this material is used in the manufacture of distilled spirits, the mash is produced in less time and is more uniform than when the whole grain is mashed; the fermentation proceeds more uniformly and with less heat; the material is more easily pumped and is less liable to clog up the pipes; the spirits are more readily distilled off and contain less impurities; the slops are practically free from spirits, and the hulls, which are recovered in a comparatively dry state, are more valuable as cattle-feed than when the whole grain is mashed. The product is therefore improved in quality and produced with a smaller expenditure of power.

I claim as my invention—

1. The herein-described method of extracting a starchy material from grain, which consists in steeping the grain, then reducing the grain, and then separating the hulls from the reduced inner portions of the kernels by sifting, substantially as set forth.

2. The herein-described method of extracting a starchy material from grain, which consists in steeping the grain, then drying the grain, then reducing the grain, and then separating the hulls from the reduced inner portions of the kernels by sifting, substantially as set forth.

3. The herein-described method of extracting a starchy material from grain, which consists in steeping the grain, then reducing the grain by whipping or beating, and then separating the hulls from the reduced inner portions of the kernels by sifting, substantially as set forth.

4. The herein-described method of extracting a starchy material from grain, which consists in steeping the grain, then drying the grain, then reducing the grain by whipping or beating, and then separating the hulls from the reduced inner portions of the kernels by sifting, substantially as set forth.

Witness my hand this 14th day of April, 1886.

J. C. SCHUMAN.

Witnesses:
WM. H. CARR,
AUSTIN TYLER.